UNITED STATES PATENT OFFICE.

JACOB PFEIFFER, OF BROOKLYN, NEW YORK, ASSIGNOR TO HIMSELF AND PAUL KOCH, OF SAME PLACE.

IMPROVEMENT IN YEAST COMPOUNDS.

Specification forming part of Letters Patent No. 169,474, dated November 2, 1875; application filed September 11, 1875.

*To all whom it may concern:*

Be it known that I, JACOB PFEIFFER, of Brooklyn, Kings county, New York, have invented a new and Improved Yeast Compound, of which the following is a specification:

My improved yeast compound consists of hops, one ounce; malt, one pint; potatoes, two quarts; wheaten flour, four ounces; and corn-starch, eight ounces, for a batch of about two pounds; but the proportions may be varied to some extent without detriment.

In preparing it I cook and mash the potatoes, mix with wheaten flour, and add the malt, and, after mixing and stirring thoroughly with water, press through a fine hair sieve; then add the corn-starch and a small quantity of hops and let the mixture ferment; then strain it and press out the water, and work the dough thoroughly by hand, making it into cakes ready for use.

This compound makes a very good article, which can be kept sweet for four to six weeks in summer, and much longer in winter.

Having thus described my invention, I claim as new and desire to secure by Letters Patent—

A yeast compound consisting of cooked and mashed potatoes, hops, malt, wheaten flour, and corn-starch, in about the proportions specified.

JACOB PFEIFFER.

Witnesses:
  A. P. THAYER,
  ALEX. F. ROBERTS.